United States Patent [19]
Peterson

[11] Patent Number: 6,010,082
[45] Date of Patent: Jan. 4, 2000

[54] IN-LINE POINT OF USE FILTER WITH RESTRICTOR VALVE AND GAUGE PORT

[76] Inventor: Kurt E. Peterson, 24580 State Hwy. 28, Glenwood, Pope County, Minn. 56334

[21] Appl. No.: 09/193,350

[22] Filed: Nov. 17, 1998

[51] Int. Cl.[7] .................. B05B 1/14; B05B 1/30; B05B 7/02; B05B 7/30
[52] U.S. Cl. ............... 239/346; 239/553.3; 239/526; 239/575; 239/590.3; 239/DIG. 14; 239/DIG. 23
[58] Field of Search ................. 239/462, 525, 239/526, 553, 553.5, 575, 590, 590.3, DIG. 14, DIG. 23, 346; 55/505, 510

[56] References Cited

U.S. PATENT DOCUMENTS

| | | |
|---|---|---|
| 1,006,890 | 10/1911 | Wilshusen ................. 239/590.3 X |
| 1,091,695 | 3/1914 | Nolden . |
| 1,255,533 | 2/1918 | Heinrich . |
| 1,822,622 | 9/1931 | Hermann . |
| 1,833,919 | 12/1931 | Sisson ..................... 55/505 X |
| 2,669,320 | 2/1954 | Shaw . |
| 2,880,753 | 4/1959 | Wilkens . |
| 2,920,716 | 1/1960 | Shada . |
| 3,920,189 | 11/1975 | Maggiacomo . |
| 4,464,186 | 8/1984 | Mann . |
| 4,810,272 | 3/1989 | Overby . |
| 5,078,762 | 1/1992 | Hung ................. 239/DIG. 14 |
| 5,704,957 | 1/1998 | Rutz ................... 55/505 X |

*Primary Examiner*—Andres Kashnikow
*Assistant Examiner*—Robin O. Evans
*Attorney, Agent, or Firm*—Albert W. Watkins

[57] ABSTRACT

An in-line point of use filter includes a restrictor flow valve and pressure gauge port integral therewith. The filter includes an internal threaded spindle which rigidly retains a coalescing filter in place. As a result of the compact spindle and filter arrangement, the entire filter assembly fits under a suction feed paint sprayer and allows the combined sprayer and filter unit to stand without toppling. The threaded spindle threads coaxially with a valve body and conducts compressed air therethrough. The compressed air passes from the threaded spindle directly into the filter media and transversely therethrough, and then from the filter media on to the external filter housing and longitudinally therewith into a small chamber carrying the pressure gauge port, the small chamber which is coupled directly into the sprayer body air inlet.

15 Claims, 3 Drawing Sheets

IN-LINE POINT OF USE FILTER WITH RESTRICTOR VALVE AND GAUGE PORT

BACKGROUND OF THE INVENTION

1. Field of the Invention

This invention pertains to fluid spraying generally, and more particularly to a gas separation filter having in combination a restrictor valve and a pressure gauge port, which is most preferably used in combination with a pneumatically powered paint sprayer and may additionally be used with other pneumatic devices.

2. Description of the Related Art

Compressed air has been used for many years in a number of diverse applications. As a source of energy or power, compressed gases offer significant advantage over electricity in safety and convenience in a work environment. For example, in a garage or other shop occupied by work tools, movable carts and vehicles, electrical insulation is readily damaged and metal conductors only offer limited flexibility. So when a vehicle or cart traverses over an electrical line, any persons present and the vehicle or cart are exposed to potentially hazardous electrical energy. Furthermore, with repeated flexing or possible kinking of the electrical cabling, metal conductors may become separated and prone to overheating or arcing, either which might result in fire. In contrast, a pneumatic line or air hose is generally fabricated from a rubber or other similar elastomeric compound which offers nearly limitless resiliency and strength, substantially greater than obtainable with electrical insulation. Even in the event an air hose is damaged, a small stream of air is released, which would only extremely rarely ever present a hazard.

Electrical tools and appliances often also generate sparks or small arcing during power switching or during motor operation, the arcs which act as a further hazard when flammable liquids or vapors are present. In many automotive and paint shops, solvents and fuels are omnipresent, thereby restricting the number and types of electrical tools that are present. In addition, when a pneumatic tool binds, no further activity or hazard is generated. However, when an electrical tool binds, frequently there is an increase in the amount of electrical power being delivered to the tool accompanied by a decrease in internal cooling, which is usually provided as a by-product of tool motion. This adverse combination also leads to over-heating and early failure of electrical tools. An electric motor additionally requires a relatively significant amount of space and mass, whereas a pneumatic motor is frequently smaller, simpler and lighter.

In spraying paint and other liquid or powder media, compressed air offers several additional advantages. Among these are the ability to form a very fine mist or particulate stream with the liquid or powder media, where the particles are well dispersed in the high velocity air stream. Some control is possible in the characteristics of the mist, as a result of gas pressure and particulate feed rate. Changes such as these are made to adjust the characteristics of the resultant film formed by the spraying.

Nevertheless, in spite of the many advantages offered by compressed air, some disadvantages are also inherent in the system. First and foremost is the possibility of contamination of the air stream. Larger particles, such as rust flakes from a corroded air tank, accumulated dust, or hose wear products may cause clogging, jamming or other device malfunction. Liquid condensation presents another formidable obstacle to those wishing to use compressed air, acting as a different form of air stream contamination. When air is compressed, a certain amount of heat is generated in the compression process. During this time, moisture contained therein may be preserved in vapor form. However, once the compressed air cools, such as might occur in a pressure tank or at the air outlet of a pneumatic device, some of the moisture will condense therefrom. This condensation may occur directly in the pressure tank, or may alternatively occur in the air hoses which distribute the compressed air to tools and other appliances. When a high speed pneumatic tool is exposed to this moisture, there is a possibility of either removing some of the necessary lubricant from the pneumatic engine or possible internal corrosion. As a result, many tool air lines include an in-line oiler which introduces additional lubricant to the tool. In the painting industry, the moisture may result in a blistering of the paint, and, if the paint is a primer or similar base coating, the moisture may have direct access to the substrate to accelerate corrosion thereon. Further compounding matters, the in-line oiler used in the tool industry is incompatible with later use of a paint sprayer, due to the presence of the lubricant in the line and the adverse affect it has on paint and other finishes. Clearly, the presence of moisture and other contaminants is highly undesirable.

To prevent the passing of moisture through the air stream to the pneumatically powered tool or apparatus, a number of filters and condensation traps have been devised in the prior art, each of which are incorporated by reference hereinbelow for their content and teachings of the art of gas separation. Representative of these is the air modifier of U.S. Pat. No. 1,255,533 to Heinrich, which illustrates an air inlet, in-line filter and pressure valve all integrated into a single structure. A stop cock is provided at a bottom end opposite the air inlet and outlet which may be used to purge the modifier of accumulated moisture. Unfortunately, the Heinrich device inefficiently uses space and so has little application at the point of use of the device. As a result, condensation that occurs in transit from the tank through the hose to the device will not be removed by the Heinrich device, which must reside adjacent the tank or at some distribution point remote from the pneumatic tool. In addition, the Heinrich device has a fairly complex construction and filter arrangement, each of which add initial expense and which also encumber routine maintenance such as a filter change. Other similar devices which serve to filter an air stream but which are inappropriate for point of use applications are illustrated by Nolden in U.S. Pat. No. 1,091,695; Shaw in U.S. Pat. No. 2,669,320; and Wilkins in U.S. Pat. No. 2,880,753.

Several devices which more directly address point of use are illustrated by Shada in U.S. Pat. No. 2,920,716; Hermann in U.S. Pat. No. 1,822,622; and Overby in U.S. Pat. No. 4,810,272, each which illustrate valves in combination with in-line filters and paint sprayer handles, though none disclose a gauge port. Unfortunately, Shada offers no way to readily remove accumulated liquid, and Hermann and Overby each require a specific tool designed around the filter and valve combination. In U.S. Pat. No. 3,920,189 to Maggiacomo et al, a filter retrofittable to a sprayer handle includes a restrictor valve, though the filter is of the cotton batting construction, which again encumbers replacement thereof. In addition, these prior art filters which incorporate cotton batting or cotton string provide substantial inherent flow restriction, which is a significant disadvantage in the newer High Volume Low Pressure (HVLP) paint guns. In addition to the poor filter material and efficacy, diameter restrictions were generally necessitated by the tendency of the filter material to extrude into openings and orifices under pressure. Furthermore, needle valves of the prior art are inherently small and limited in orifice cross-section. These types of valves are also particularly disadvantageous. While each of these prior art references enabled various respective advancements, none has proven satisfactory as a retrofit, particularly in the demanding art of paint spraying.

SUMMARY OF THE INVENTION

In a first manifestation of the invention, an in-line point of use filter is compact and easily retrofitted onto pre-existing pneumatic devices The in-line filter is also easily maintained and purged of accumulated moisture. The filter comprises a valve body through which compressed air may pass; a valve means capable of restricting the flow of compressed air through the valve body; a filter spindle engaged with the valve body and communicating therewith to conduct compressed air from said valve body; a filter circumscribing the filter spindle and compressively retained against the valve body, through which said compressed air passes after leaving the filter spindle; and a housing removable from the valve body and sealingly engaged therewith which circumscribes said filter and conducts compressed air from filter to an outlet port.

An additional manifestation of the invention includes the use of the filter assembly in combination with a suction type sprayer, wherein the filter assembly fits under the handle while not disrupting the sprayer from level.

OBJECTS OF TIE INVENTION

The present invention seeks to overcome the limitations of the prior art of in-line point of use filters. A first objective thereof is to provide a low-cost device usable with a pneumatic line. A second objective is that the device be compact, more preferably so compact as to fit under the handle of an upright suction feed spray gun. Another objective of the present invention is to enable simple drainage of accumulated liquid without having to disconnect from the air line or having to move remotely from the point of use for such drainage. Yet another objective is to allow for unencumbered filter replacement. A further objective is to provide a construction which is durable and has a substantial life expectancy, even when exposed to moisture and other contamination present in an air line. Another objective is to provide the compact device with an optional pressure gauge in conjunction with the in-line filter and restrictor valve, while still preserving the compact characteristic which allows for actual point of use application. Another objective is the provision of a low cost and easily replaceable disposable filter element that is efficient and non-restrictive. A further objective is the provision of an element which does not require a separate plastic housing, and which may readily be installed without fear of stripping or breakage. These and other objectives are accomplished by the preferred embodiment of the invention, which will be best understood when considered in conjunction with the appended drawing figures.

DESCRIPTION OF THE PREFERRED EMBODIMENT

Figure 1:
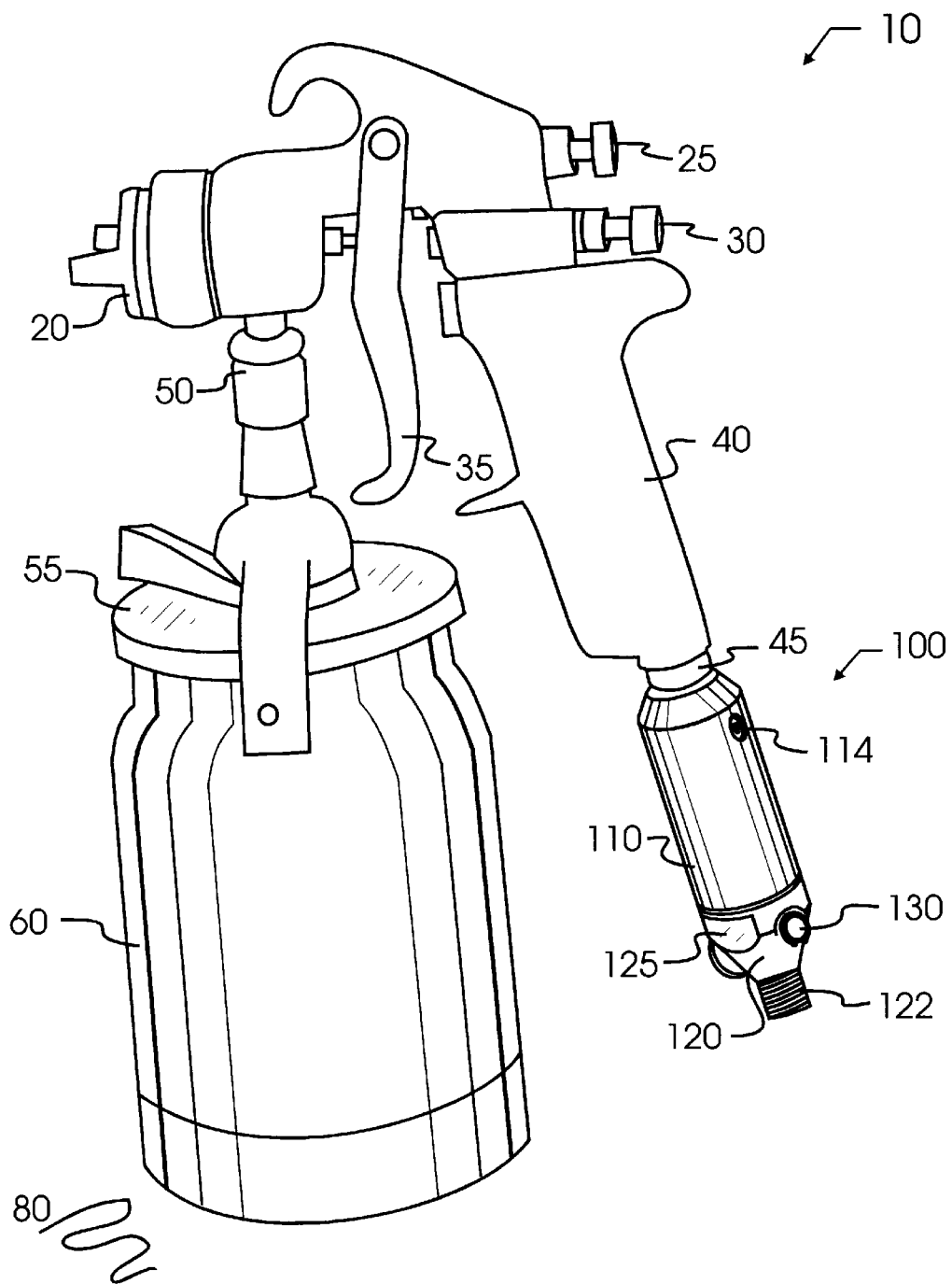
FIG. 1 illustrates the preferred embodiment of the invention installed at the air inlet of a suction feed paint sprayer.

A prior art paint sprayer 10 is illustrated in FIG. 1 coupled with the preferred embodiment in-line point of use filter 100.

Sprayer 10 is one of the prior art type having a spray nozzle 20, adjusting valves 25 and 30, finger trigger 35, handle 40, and threaded coupling 45 which acts as the coupling to let compressed air into sprayer 10. In addition, this particular sprayer 10 which illustrates the most preferred embodiment of the invention further includes a suction feed coupler 50, container cover 55, and reservoir 60. Typically, a liquid paint composition is contained within reservoir 60, and is drawn by suction towards spray nozzle 20. Those familiar with the art will recognize that sprayer 10 is illustrated in the non-use position, resting upon surface 80, which might be a table top or other counter or work bench surface. Attached at threaded coupling 45 is the in-line point of use filter 100.

Figure 2:
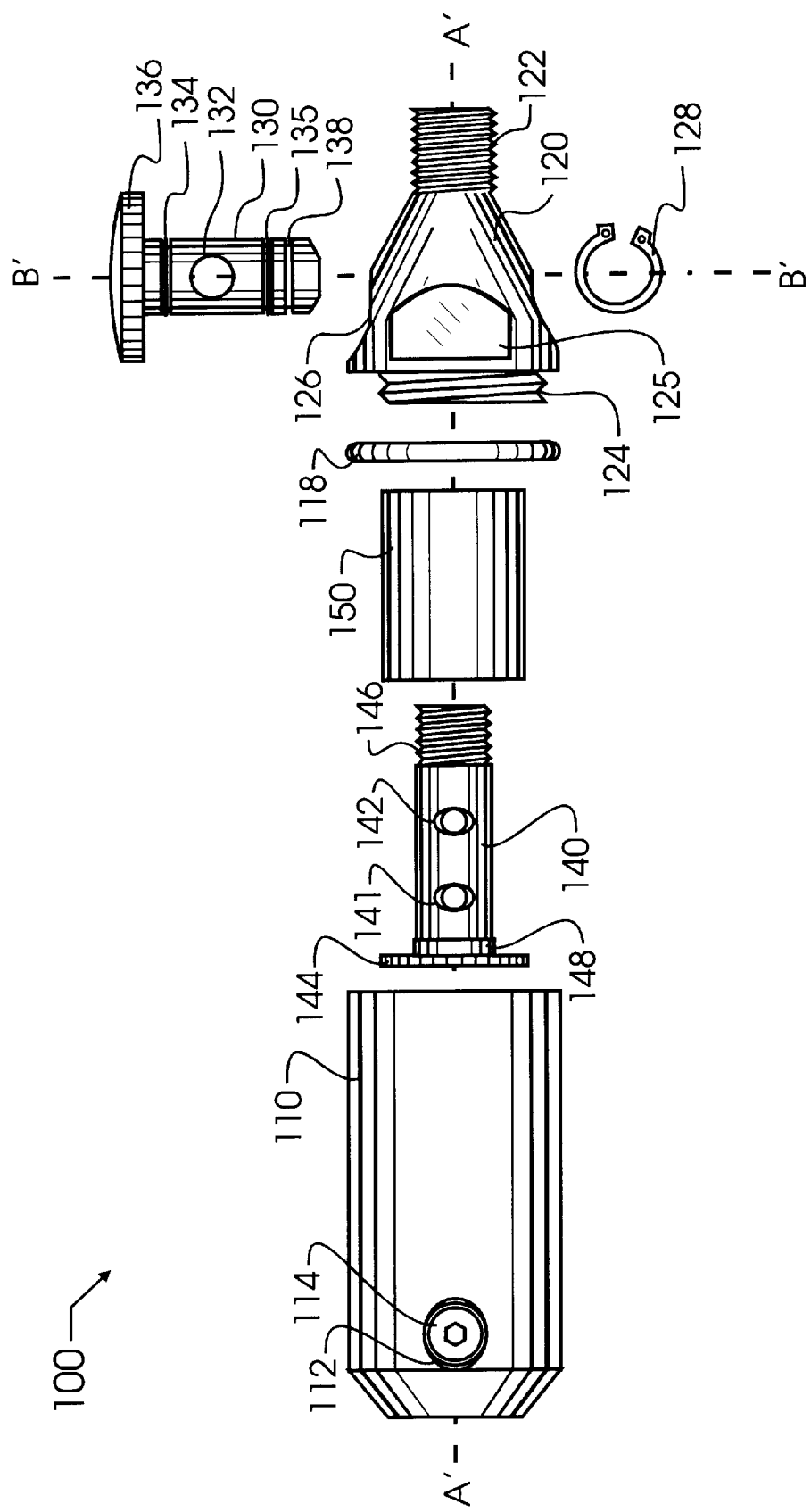
FIG. 2 illustrates the preferred embodiment of FIG. 1 by an exploded assembly plan view.
Figure 3:
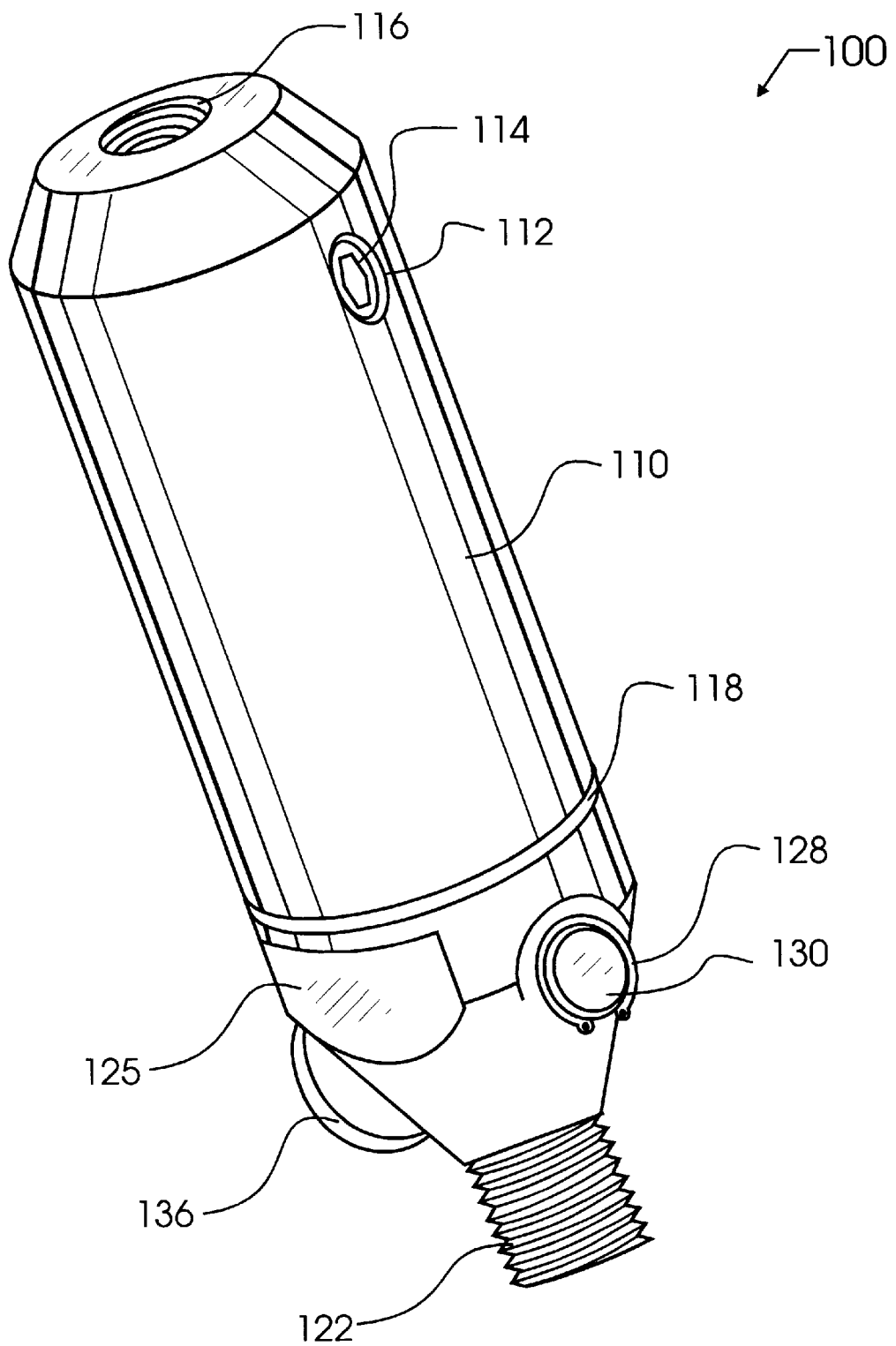
FIG. 3 illustrates the preferred embodiment of FIG. 1 in a projected view.

Filter 100 is illustrated in greater detail in FIG. 2 by exploded assembly plan view, though like components have been numbered similarly in each of the figures. Filter 100 includes a chamber housing 110 having a threaded port 112 therein, which, in the illustrated embodiment, is capped by a socketed head plug 114. Alternatively, a pressure gauge may be threaded into threaded port 112 for accurate pressure monitoring. Internally within chamber housing 110 at an end of housing 110 adjacent to port 112 is an internal, female thread 116 which engages with threaded coupling 45, or similar threading. Longitudinally opposite of port 112 is a similar internal threading which engages with male threads 124 of valve assembly 120. Valve assembly 120 has a second male threading 122 longitudinally opposite of threads 124, which are designed to engage with a female threaded coupling which typically terminates an air hose. On the surface of valve 120 there are formed several special features, including a flat 125 on each side of valve body 120 to which a wrench or similar device may be attached for tightening and removal. Additionally, a small indentation 126 is provided for finger grip 136 of valve stem 130, indentation 126 serving to allow finger grip 136 to mount more flush with valve body 120 while also preventing accidental activation thereof by a user, whose hand will be displaced towards housing 110 but may occasionally inadvertently stray towards finger grip 136.

Valve stem 130 extends transversely through valve assembly 120 in a transverse bore therein. Valve stem 130 has a hole 132 therethrough that cooperates with a corresponding hole in valve body 120. The hole in valve body 120 passes longitudinally therethrough centrally within valve body 120. Rotation of valve stem 130 by grasping and turning finger grip 136 will rotate hole 132 to be at times coaxial with the corresponding hole through valve body 120, in which case no restriction occurs. As stem 130 is rotated from this coaxial alignment, hole 132 will no longer be coaxial, and the opening formed between the two holes will diminish in cross-sectional area. At some angle of rotation which approaches ninety degrees from co-axial, hole 132 will not open at all into the hole in valve body 120, and so valve stem 130 will close off any significant flow of air therethrough. Depending upon the tolerances developed here, valve stem 130 may be able to entirely cut off all air flow through in-line filter 100, but in a more preferred embodiment due to cost constraints, the vast majority of air flow will be eliminated, though some seepage of air is considered acceptable. O-rings 134, 135 seal with the transverse bore through valve assembly 120 to prevent any seepage of compressed air therefrom. To retain valve stem 130 in place, an e-ring or other split ring 128 is clipped around stem 130 into groove 138. Once e-ring 128 is clipped into place, valve stem 130 will either engage with e-ring 128 against valve assembly 120 or with finger grip 136 against valve body 120, thereby effectively preventing transverse movement and thereby retaining valve stem 130 within the transverse bore of valve body 120.

Internally of male threads 124 but relatively coaxial therewith is a female thread which mates with male thread 146 of filter spindle 140. Filter spindle 140 extends coaxial with the longitudinal opening in valve body 120 and also has a longitudinal opening extending partially therethrough coaxial with the longitudinal hole through valve body 120. The center opening in spindle 140 terminates just prior to shoulder 148. leaving shoulder 148 and knurled edge 144 to close off the central opening. Passing radially through the wall of spindle 140 are a plurality of holes 141, 142 which allow the compressed air to pass effectively from inside of male threading 122 through spindle 140 and from there directly into filter 150. As the compressed air passes through filter 150, which is preferably of the coalescing type, any moisture will coalesce thereon and be held adjacent to valve body 120. The air will then pass from filter 150 inside of housing 110 and out the top adjacent port 112. Spindle 140 includes shoulder 148 which is of just slightly greater diameter than the rest of spindle 140, thereby expanding and aligning filter 150 therewith at the time of installation. Additionally, shoulder 148 ensures a slight amount of extra compression against filter 150, helping to ensure passage of air through filter 150 and discouraging bypass past shoulder 148. Shoulder 148 also ensures a better feel when screwing spindle 140 into place, since extra friction is generated between shoulder 148 and filter 150 just prior to fully seating filter 150. Knurled edge 144 merely provides a gripping surface during installation and removal of filter 150, which is considered to be a regular maintenance item. An O-ring seal 118 provides the necessary seal between housing 110 and valve body 120.

While a number of materials may be suited for use in the construction of filter 100, filter 100 will be exposed to a number of relatively harsh conditions, in particular the moisture which coalesces in filter 150. Iron and iron-based materials tend to corrode readily and are additionally relatively massive. Preferably, the components for filter 100 will have corrosion resistance and may include stainless alloys and brass materials, among others. However, since filter 100 is designed for use with paint sprayers and other pneumatically powered equipment, much which is hand-held, it is more preferable to manufacture filter 100 and each of the components thereof, excepting O-rings 118, 134, 135 and e-ring 128, from an aluminum alloy. Most preferably, the filter 100 will be constructed from an aircraft aluminum alloy and be finished with an anodized coating thereon. Filter element 150 will be preferably a coalescing filter, as aforementioned. These types of filters are well known in the art and readily available from a number of different suppliers.

During operation, as aforementioned, moisture tends to accumulate within housing 110 adjacent valve body 120. As a practical matter, this moisture should be periodically purged. Purging is accomplished by first closing valve stem hole 132 relative to valve body 120, thereby restricting air flow. Next, finger trigger 35 is pulled to the first stage (air only). While the trigger is held at first stage, the valve body 120 is loosened from housing 110. Generally, this requires ½ to 1 turn, or until air starts to purge. Next, the paint gun trigger is released, and any water will be purged due to the resultant air flow past o-ring 118. Finally, finger trigger 35 is pulled to first stage, and valve body 120 is hand tightened to housing 110, thereby re-sealing valve body 120 to housing 110. Valve stem may be restored to it's previous setting, and painting may then be resumed.

While the foregoing details what is felt to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims hereinbelow.

I claim:

1. An in-line point of use filter which is compact and easily retrofitted onto pre-existing pneumatic devices, wherein said in-line filter is easily maintained and purged of accumulated moisture, and which filter further has a minimum resistance to air flow therethrough when so desired, comprising:

a valve body through which compressed air may pass;

a valve means capable of restricting the flow of said compressed air through said valve body or enabling a relatively unrestricted air flow therethrough;

a filter spindle engaged with said valve body an communicating therewith to conduct said compressed air from said valve body;

a filter circumscribing said filter spindle and compressively retained against said valve body thereby, through which said compressed air passes after leaving said filter spindle; and a housing removable from said valve body and sealingly engaged therewith which circumscribes said filter and conducts said compressed air from said filter to an outlet port.

2. The in-line point of use filter of claim 1 wherein said valve body has a longitudinal passage therein for passing said compressed air therethrough.

3. The in-line point of use filter of claim 2 further comprising a transverse bore in said valve body which contains said valve means.

4. The in-line point of use filter of claim 3 wherein said valve means further comprises a rotary stem having a hole therein which in a first position is coaxial with said longitudinal passage in said valve body and in a second rotated position is axially aligned transverse to said longitudinal passage in said valve body.

5. The in-line point of use filter of claim 2 wherein said longitudinal passage in said valve body is coaxial with a longitudinal passage in said filter spindle.

6. The in-line point of use filter of claim 5 wherein said filter spindle further comprises radially arranged holes which communicate said compressed air from said filter spindle longitudinal passage to said filter.

7. The in-line point of use filter of claim 1 wherein said filter spindle is removably threaded to said valve body.

8. The in-line point of use filter of claim 7 wherein said filter spindle further comprises a shoulder longitudinally opposed from said valve body.

9. The in-line point of use filter of claim 1 further comprising a gauge port in said housing longitudinally opposed from said valve body and adjacent to said outlet port.

10. A paint sprayer having a handle thereon into which compressed air flows and a base upon which said sprayer rests, comprising in further combination a filter assembly having a valve means therein and a housing therearound, a filter media inside said filter assembly adjacent to said valve means and retained compressively therein by a spindle, said spindle and said filter media directing air flow from said valve means transversely through said filter media and into said housing whereby said compressed air flows transversely to said sprayer handle, and a pressure gauge port extending through said housing into a small chamber adjacent said spindle and also adjacent to said sprayer handle, whereby said filter assembly and said paint sprayer handle combine with said paint sprayer to rest upon said base unencumbered by said handle, said filter assembly, or a hose conducting compressed air to said filter assembly due to the transverse air flow arrangement through said filter assembly, which requires minimum axial dimension.

11. The paint sprayer and filter assembly combination of claim 10 wherein said spindle further comprises a passageway inside said spindle which directs said compressed air longitudinally into a central radius of said filter media.

12. An in-line point of use filter comprising:
 a valve body having a first longitudinal passage therein for conducting compressed air,
 a rotary valve stem transverse to said longitudinal passage and having a hole therein which is rotatable from a first position coaxial with said first longitudinal passage to a second position transverse thereto;
 a filter spindle threaded to said valve body having a second longitudinal passage therein coaxial with said first longitudinal passageway and having a diameter similar to a diameter of said first longitudinal passageway, and further having a set of radial passageways therethrough;
 a coalescing filter media of generally cylindrical shape having an inner surface exposed to said radial passageways and an exterior surface exposed to an open chamber between said filter media and a circumscribing housing;
 said circumscribing housing threaded to said valve body and sealingly engaged therewith, and further having a threaded port through which a pressure gauge or other similar instrument may be attached, said threaded port extending radially through said circumscribing housing; and
 an outlet coaxial with said first longitudinal passage through which said compressed air may pass.

13. The in-line point of use filter of claim 12 wherein said circumscribing housing sealing engagement may be broken by partially unthreading said housing from said valve body, to thereby enable a limited amount of fluid to escape therebetween.

14. The in-line point of use filter of claim 13 wherein said fluid includes moisture which ordinarily coalesces upon said filter media during the passage of compressed air therethrough.

15. The in-line point of use filter of claim 12 wherein said first and second longitudinal passageways are of a diameter corresponding to a source of said compressed air, wherein a high volume low pressure paint gun will encounter minimum air flow restriction when said rotary valve stem hole is in said first coaxial position.

* * * * *